US 9,178,217 B2

(12) United States Patent
Jung

(10) Patent No.: US 9,178,217 B2
(45) Date of Patent: Nov. 3, 2015

(54) MULTIPLY-CONDUCTIVE MATRIX FOR BATTERY CURRENT COLLECTORS

(76) Inventor: Joey Chung Yen Jung, Vancouver (CA)

( * ) Notice: Subject to any disclaimer, the term of this patent is extended or adjusted under 35 U.S.C. 154(b) by 793 days.

(21) Appl. No.: 13/147,195

(22) PCT Filed: Jan. 5, 2010

(86) PCT No.: PCT/CA2010/000006
§ 371 (c)(1),
(2), (4) Date: Jul. 30, 2011

(87) PCT Pub. No.: WO2010/088755
PCT Pub. Date: Aug. 12, 2010

(65) Prior Publication Data
US 2011/0287314 A1   Nov. 24, 2011

Related U.S. Application Data

(60) Provisional application No. 61/207,048, filed on Feb. 5, 2009.

(51) Int. Cl.
*H01M 4/66* (2006.01)
*H01M 4/72* (2006.01)
(Continued)

(52) U.S. Cl.
CPC ........... *H01M 4/64* (2013.01); *H01M 4/66* (2013.01); *H01M 4/663* (2013.01); *H01M 4/668* (2013.01);
(Continued)

(58) Field of Classification Search
CPC ........... H01M 4/72; H01M 4/73; H01M 4/74; H01M 4/742; H01M 4/745; H01M 4/747; H01M 4/64; H01M 4/66; H01M 4/668; H01M 4/808; H01M 4/663; Y10T 29/10

USPC .......................... 429/209–246; 29/2
See application file for complete search history.

(56) References Cited

U.S. PATENT DOCUMENTS 3,635,676 A   1/1972   Sands
3,709,843 A *  1/1973   Zocco et al. .......... 428/314.2
(Continued)

FOREIGN PATENT DOCUMENTS

CA   2619013    3/2007
CA   2726308   11/2011
(Continued)

OTHER PUBLICATIONS

"High-strength high-surface area porous carbon made from submicron diameter carbon filaments" Shui, X. and D.D.L. Chung, Carbon v34 n6 (1996) pp. 811-813.*
(Continued)

*Primary Examiner* — Milton I Cano
*Assistant Examiner* — Michael Dignan
(74) *Attorney, Agent, or Firm* — Klarquist Sparkman, LLP

(57) ABSTRACT

A multiply-conductive matrix (MCM) for a current collector/electrode and a method of making the MCM are disclosed. The MCM includes a frame, preferably including a lug, the frame preferably made from a reticulated polymer foam substrate, and a body preferably made from the same substrate. The specific surface area of the frame is greater than the specific surface area of the body, resulting in greater rigidity and strength of the frame when the body and frame are joined to form an assembled matrix. Electrically conductive material is applied to the matrix to form the current collector. Optionally, a bonding material is also applied. Electro-active paste is applied to current if collector. The resulting MCM-based electrodes are ultra light and may be used as anode or cathodes in a lead-based battery, lithium ion battery, and nickel metal hydride battery for improved performance.

22 Claims, 5 Drawing Sheets

(51) Int. Cl.
*H01M 4/02* (2006.01)
*H01M 4/64* (2006.01)
*H01M 4/80* (2006.01)
*H01M 4/74* (2006.01)

(52) U.S. Cl.
CPC ............... *H01M 4/808* (2013.01); *H01M 4/72* (2013.01); *H01M 4/74* (2013.01); *H01M 4/742* (2013.01); *H01M 4/745* (2013.01); *H01M 4/747* (2013.01); *Y10T 29/10* (2015.01)

(56) References Cited

U.S. PATENT DOCUMENTS

| | | | |
|---|---|---|---|
| 3,720,574 A | | 3/1973 | Kunc |
| 4,436,601 A | | 3/1984 | Branchick et al. |
| 4,444,852 A | * | 4/1984 | Liu et al. ............ 429/406 |
| 4,535,040 A | | 8/1985 | Kline |
| 4,606,383 A | | 8/1986 | Yanik |
| 4,975,515 A | | 12/1990 | Nalepa |
| 5,462,625 A | * | 10/1995 | Purcocks ............ 156/264 |
| 5,478,676 A | | 12/1995 | Turi |
| 5,571,415 A | * | 11/1996 | Clikeman et al. ........ 210/490 |
| 5,746,856 A | * | 5/1998 | Hendershot et al. ...... 156/73.4 |
| 5,817,704 A | * | 10/1998 | Shiveley et al. ........ 521/63 |
| 6,020,089 A | | 2/2000 | Harada |
| 6,306,215 B1 | | 10/2001 | Larkin |
| 6,465,133 B1 | | 10/2002 | Kariya |
| 6,472,105 B2 | * | 10/2002 | Murai et al. ............ 429/306 |
| 6,770,399 B2 | * | 8/2004 | Umeno et al. .......... 429/231.8 |
| 6,979,513 B2 | * | 12/2005 | Kelley et al. ............ 429/121 |
| 7,060,391 B2 | | 6/2006 | Gyenge |
| 7,341,806 B2 | | 3/2008 | Kelley |
| 8,399,134 B2 | * | 3/2013 | Kelley et al. ............ 429/235 |
| 2002/0155338 A1 | * | 10/2002 | Croset ............ 429/38 |
| 2004/0126663 A1 | | 7/2004 | Sudano |
| 2005/0100791 A1 | | 5/2005 | Gyenge |
| 2006/0165876 A1 | | 7/2006 | Gyenge |
| 2006/0292448 A1 | * | 12/2006 | Gyenge et al. ........ 429/236 |
| 2009/0130549 A1 | * | 5/2009 | Kelley et al. ............ 429/163 |
| 2009/0269658 A1 | | 10/2009 | Shukla |

FOREIGN PATENT DOCUMENTS

| | | |
|---|---|---|
| JP | 57-210569 | 12/1982 |
| KR | 2005048738 | 5/2005 |
| WO | 00/43314 | 2/2000 |
| WO | 2008002024 | 1/2008 |

OTHER PUBLICATIONS

Soria, et al. "Lead-Acid Batteries with Polymer Structured Electrodes for Electric Vehicle Applications" 1999. Journal of Power Sources. 78:220-230).

Martha et al. "A Low-Cost Lead-Acid Battery with High Specific Energy" 2006. Journal of Chemical Science. 118 (1):93-98.

\* cited by examiner

MULTIPLY-CONDUCTIVE MATRIX FOR BATTERY CURRENT COLLECTORS

STATEMENT OF PRIORITY

Pursuant to 35 U.S.C. §371 I claim the priority benefits of international application PCT/CA2010/000006 filed on Jan. 5, 2010, which claims the priority benefits of U.S. Provisional Application 61/207,048 filed on Feb. 5, 2009.

BACKGROUND OF THE INVENTION

1. Field of the Invention

This invention relates to current collectors/electrodes for batteries and methods for producing current collectors/electrodes.

2. Description of the Related Art

Since the very early days of commercially available lead-acid batteries in the late $19^{th}$ Century, battery electrodes have been made from pasted plates. Such plates, called "current collectors," commonly have a support base made of a porous matrix, such as a metal grid. Traditionally the grid is a lead alloy in which the holes are filled with an electro-active paste such as a mixture of red lead and 33% dilute sulfuric acid. The process of applying the paste to the matrix is referred to as "pasting". The term "matrix", as used herein, refers to the base structure of a current collector to which the electro-active paste is applied. Such a matrix may be characterized or classified, in part, on the basis of its specific surface area, normally expressed in the units $m^2/m^3$. The term "ground substance" and "matrix substrate" refer to the porous substance of which a matrix is made.

Recently attempts have been made to find non-metal matrix substrates that are more suitable for current collectors than lead grids. The goal has been to find a sturdy, light-weight, porous substrate that retains electro-active paste in the hostile environments and operating conditions of a wide range of battery applications. Kelley et al, U.S. Pat. No. 6,979,513 ("Kelley"), describe the use of carbon foam to form a battery current collector. Gyenge et al in U.S. Pat. No. 7,060,391 ("Gyenge") teach the use of carbon foam deposited with a layer of lead-tin alloy in the construction of a current collector for a lead acid battery.

These devices can improve the utilization efficiency of positive active mass, and battery energy density. However, current collectors such as those of Kelley and Gyenge employ cast solid lead or lead alloy frames and/or lead connectors—also known as "lugs"—in order to improve electrical current distribution and structural integrity. These lead frames and/or lugs are relatively heavy, which negates any weight savings achievable from the use of carbon foam, and, consequently, there is basically no or negative gain in power density and little improvement in energy density. Similarly, the weight of present nickel metal hydride battery current collectors is relatively high.

An additional drawback is that carbon foam is fragile and lacks structural integrity, which complicates manufacturing processes such as battery pasting and battery assembling. For instance, whilst a carbon foam matrix is much lighter than metal-based matrices carbon foam current collectors of the Gyenge type must be thicker than a conventional lead grid as a result of the need to maintain the structural integrity and strength of the carbon foam. Consequently, the number of such thick current collectors that can be arranged in parallel and series internally is actually less than in a battery using conventional lead grids. This means that a lead acid battery employing the Gyenge type current collectors have lower power density than the conventional lead acid battery.

Those skilled in the art are also familiar with deficiencies of other types of current collectors. For example, metal-foil current collectors presently used in lithium ion batteries have at least two problems: 1) low volume cathode material loading, given that the battery has a very thin layer of cathode material applied onto the metal sheet current collector, limiting the battery capacity; and 2) high risk of thermal runaway due to poor electrical conductivity of the cathode material such as $Li-CoO_2$, $Li-MnO_2$, and $Li-FePO_4$. Thermal runaway may occur, for example, when a microscopic impurity such as copper or nickel is mixed inside the cathode material, which can converge on one spot, leading to a substantial electrical short and development of a sizable current between the positive and negative plates.

From the foregoing discussion it is apparent that a need exists for a matrix that is made of ultra light material and yet has sufficient rigidity and strength to serve as the base for a current collector. Accordingly, the present invention provides a novel and non-obvious multiply-conductive matrix (MCM) for a current collector that results in improved battery power density, energy density, and electrical conductivity as well as enhanced battery safety.

SUMMARY OF THE INVENTION

In the interest of clarity, a brief overview of the invention is provided here to elucidate how certain terms of the art are used herein. Matrix substrate, which is the material that a matrix is made of, is cut into a frame piece and a body piece. The frame piece typically includes a lug, also referred to as a "connector" in the art. The frame piece and body piece are assembled into a matrix that has two regions—a body and a frame, with the frame surrounding the body. The frame may also include one or more strips that run through the body. The matrix is treated with conductive material. Because of the differences in specific surface area or because of the manner of application or amount of application of the conductive material, after applying the conductive material, the body and the frame of the matrix have different conductivities. Such a matrix is therefore referred to as a multiply-conductive matrix or MCM. The matrix, once it has been made electrically conductive, is equivalent to a current collector, and so it is also properly referred to as an MCM-based current collector. The MCM-based current collector is converted into an electrode by applying electro-active paste to fill the pores of the matrix. Depending on the matrix substance, this pasting may be preceded by treating the matrix with a bonding coat. The pasted current collector, once cured, trimmed, and finished becomes the electrode. Depending on the details of the process and materials used, the resulting electrode can be employed as either an anode or a cathode in a variety of different types of batteries, including lead-based, lithium ion, and nickel metal hydride batteries.

Thus, there is provided an MCM that can be used to form a base for a current collector, and, hence, for electrodes, both anodes and cathodes. The MCM is composed of an ultra light substrate such as reticulated polyurethane foam (RPUF) that is treated with a conductive material so as to become electrically conductive. The conductive matrix, or current collector, is then optionally coated with a layer of metal or metal alloy for bonding to electro-active paste. The RPUF matrix has the advantage of having a higher specific surface area but is lighter than those of conventional current collectors, including current collectors using a carbon foam matrix.

The MCM of the invention may have at least two regions that are distinguished from one another in that one region, normally a frame region, is stronger and more rigid than the body region it encloses. This gives the current collector the additional strength it needs to maintain its structural integrity. The frame and the body regions may also have differing electrical conductivities, with the frame having a higher conductivity than the body. This differential in electrical conductance enhances the functional parameters of the electrode, and, hence, the battery. Preferably, the frame is continuous with a lug that extends outward from the frame to allow a plurality of current collectors to be electrically interconnected. Thus, it is not necessary to separately attach a lug to the current collector as is now required with known current collectors. For ease of description, the terms "frame" and "frame region" are understood to include the lug, unless otherwise indicated.

The specific surface area of the different regions of the MCM determines the electrical conductance of the regions of the matrix once an electrical conducting material is applied to the matrix. I have discovered that by judicious choice and preparation of the polymer matrix substance, as disclosed below, if the frame region of a matrix has a high specific surface area relative to the body, the current-conducting properties will be enhanced and at the same time the frame will be denser and stiffer than the body. Consequently, such a frame enhances electrical current distribution through the electrode and simultaneously provides structural support for the electrode. This allows one to dispense with traditional lead frames. These advantages can be multiplied if the frame includes one or more strips that run through the body, as disclosed below.

A method for making an MCM-based current collector is also disclosed herein. One embodiment of the method includes (a) forming a first piece for a frame, including a lug, from a matrix substrate such as RPUF, (b) forming a second piece for a body from the matrix substance wherein the body piece has a specific surface area greater or less than the frame piece, and (c) attaching the frame piece to the body piece to produce a matrix having a framed body wherein the specific surface area of the frame and the body regions are different from each other. Such an MCM is converted to a current collector by applying an electrical conductive material to the matrix to produce a current collector having regions of different electrical conductivity depending on the specific surface areas of the regions. Such a current collector can be converted into an electrode by coating the matrix with a bonding material to enhance bonding of an electro-active paste, and pasting the assembled matrix frame and body with the paste to produce an electrode having different electrical conductivity in the frame region than in the body region. Generally, it is most advantageous if the conductivity of the frame is greater than the conductivity of the body.

One alternative embodiment of the method for making an MCM-based current collector includes (a) forming a first piece for a frame, including a lug, from matrix substrate, (b) forming a second piece for a body from matrix substrate by cutting the second piece to have substantially the same outer dimensions as the frame piece, (c) juxtaposing the frame piece and the body piece by placing a face of the frame piece against a face of the body piece, (d) compressing the frame piece and body piece together to produce an MCM in which the frame region has a higher specific surface area than the body region, and (e) applying an electrically conductive material to the matrix to produce a current collector in which the conductivity of the frame is greater than the conductivity of the body. Such a current collector is made into an electrode in the manner disclosed in the preceding paragraph, and in more detail below.

Yet another alternative embodiment of the method for making an MCM-based current collector includes (a) forming a first piece from matrix substrate, (b) folding a width of one or more edges of the substrate back upon the substrate to produce double-thickness edges having two layers, (c) cutting one double layer edge to form the lug, (d) compressing together the two layers of the folded edges to produce a frame region (folded area) about the body region (unfolded area), whereby the frame region has a higher specific surface area than the body region, (e) applying an electrically conductive material to the matrix to produce a current collector in which the conductivity of the frame is greater than the conductivity of the body.

A number of known methods may be used to make the matrix substrate conductive. One example is depositing metal salt by acid etching on the matrix surface followed by electroless plating. Alternatively, the matrix substance can be made conductive by spraying conductive coating or plasma coating over its surface. In yet another example, carbonization of the matrix substance is employed. These various methods may be performed differently for the body and the frame in order to provide or to enhance the differences in electrical conductivity.

In order to enhance the bonding of the paste to the matrix substance, metal or metal alloy may be applied by one of various methods such as electroless plating, electroplating, metal injection molding and extruding, and chemical vapor deposition. The pasting of the current collector can be carried out by methods currently known in the art.

The advantages of an MCM-based electrode according to the invention are many, but they are particularly evident in terms of power density relative to, for instance, carbon foam electrodes. For a lead-based battery, the invention results in reduced battery weight, improved structural integrity, and increased energy density and power density. Whereas performance of existing carbon foam electrodes lags behind the conventional lead electrodes, the MCM-based electrodes of the present invention offer substantially enhanced performance over both carbon foam and lead electrodes.

In a lithium ion battery, the MCM-based electrode of the present invention improves volume cathode active material loading, resulting in higher battery capacity, and enhances electric contact between the current collector and cathode material, thus reducing the risk of thermal runaway. For a nickel metal hydride battery, the MCM of the present invention results in decreased nickel consumption.

The present invention may be embodied in other specific applications and types of batteries without departing from its essential characteristics.

BRIEF DESCRIPTION OF THE DRAWINGS

In order that the advantages of the invention will be readily understood, a more particular description of the invention briefly described above will now be provided with reference to specific embodiments illustrated in the appended drawings. It is to be understood that these drawings depict only typical embodiments of the invention and the best mode presently known to me for making and using the invention. However, many useful embodiments fall within the scope of the appended claims. The structures illustrated in the drawings are not necessarily drawn to scale.

DETAILED DESCRIPTION OF THE INVENTION

Structure

References to elements, steps, features, and advantages herein with respect to a particular embodiment do not imply that those elements, steps, features and advantages apply to only that embodiment, or that they apply to all embodiments. Rather, such language is understood to mean that a specific element, step, feature, or advantage described in connection with an embodiment is included in at least that one embodiment. For the sake of clarity, structures, materials, or operations well-known in the art are not shown or described in detail in order to avoid obscuring the many novel aspects of the invention.

Figure 1:
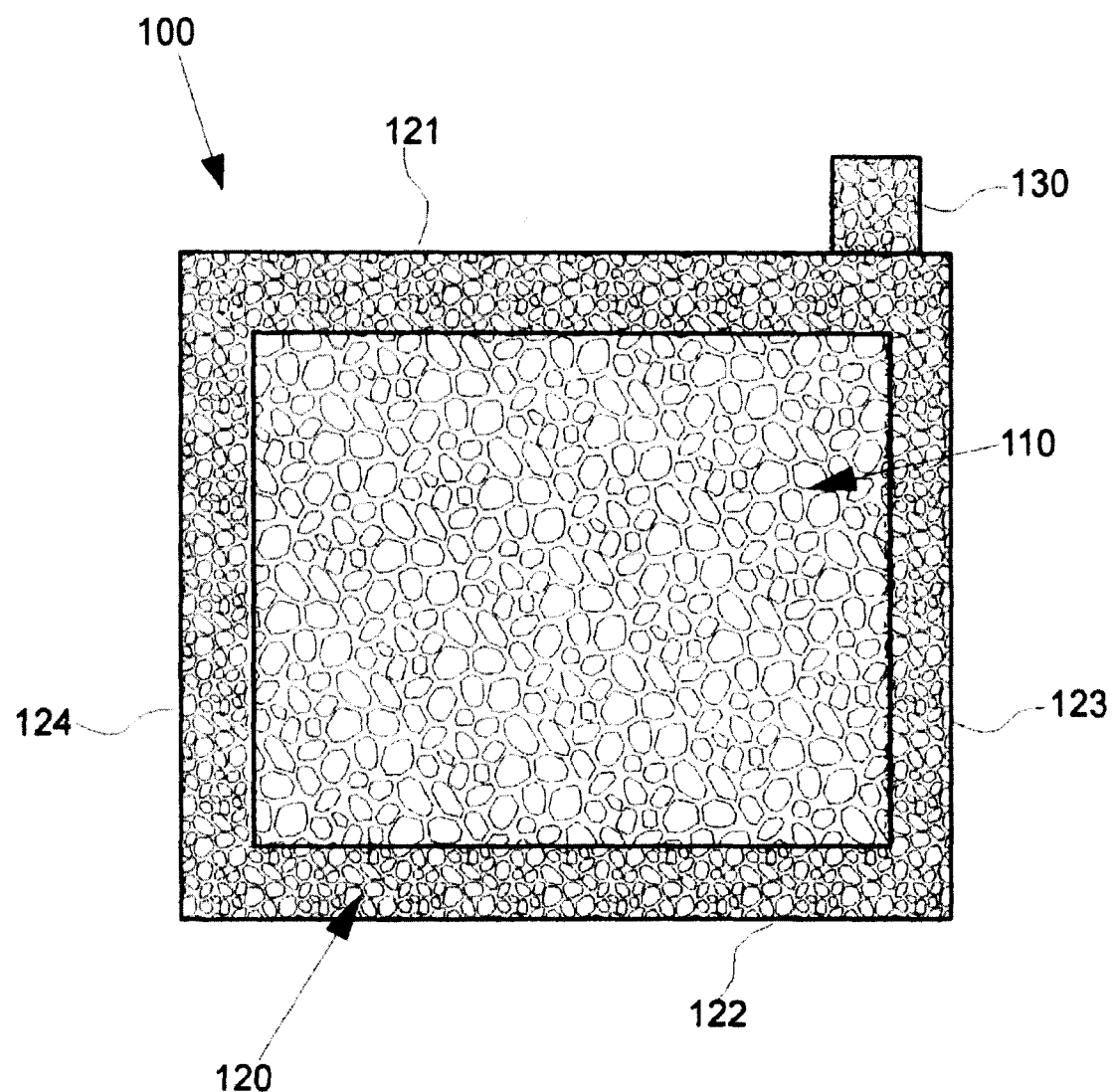
FIG. 1 is a vertical sectional view of a single-compartment embodiment of an MCM in accordance with the present invention.

FIG. 1 is an illustration of a single-compartment embodiment of an MCM 100 in accordance with the present invention. The matrix has two distinct regions as indicated by the different fill patterns: body 110, and frame 120. The frame and body are made from two pieces of matrix substrate such as RPUF cut to shape and joined together as disclosed in the "Methods" section below. The assembled MCM is a single, unitary structure comprising at least two regions of distinct specific surface area that will result in two regions with different electrical conductivities, as described below. Because of its higher specific surface area, the frame is stronger and more rigid than the body.

Although the invention is applicable to batteries of any conceivable shape, the frame illustrated in FIG. 1 is rectangular, having a top 121, an opposing bottom 122, a first side 123, and a second side 124, opposing the first side. The terms "top," "bottom," and "side" or "sides" are used with respect to the orientation of the figures in order to make the present disclosures clear. These terms are not limiting and do not necessarily refer to the orientation of the frame or the battery when in use.

Lug 130 protrudes from, and is a part of, the frame in the sense that it is physically and electrically continuous with the frame. Preferably the lug and frame are made of the same piece of matrix substrate cut to the appropriate size and shape. Lugs are well known in the art and function to provide electrical continuity between adjacent current collectors. Prior to this invention it has been necessary to produce lugs separately from the current collector and connect the two by various labor-intensive techniques, such as spot-welding, casting, and etc. One novel and useful aspect of the present invention is cutting the frame and lug out of a common blank of substrate material to produce a single frame piece that includes the lug, and thereby dispensing with separate and time consuming steps of connecting a separate lug to the current connector.

Figure 2:
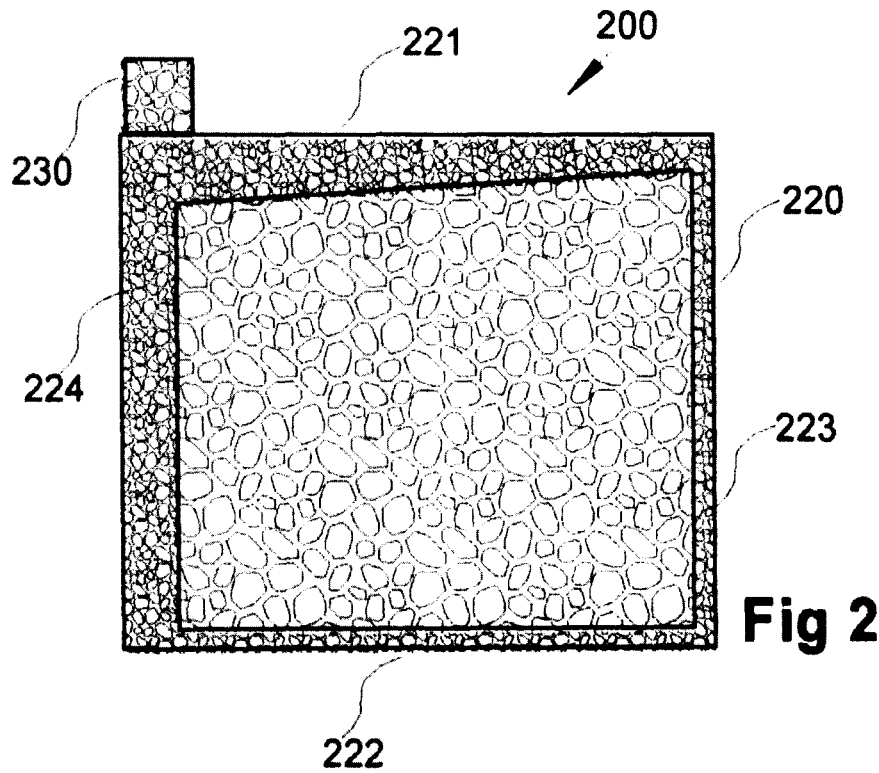
FIG. 2 is a sectional view of an alternative single-compartment embodiment of an MCM in accordance with the present invention.
Figure 3:
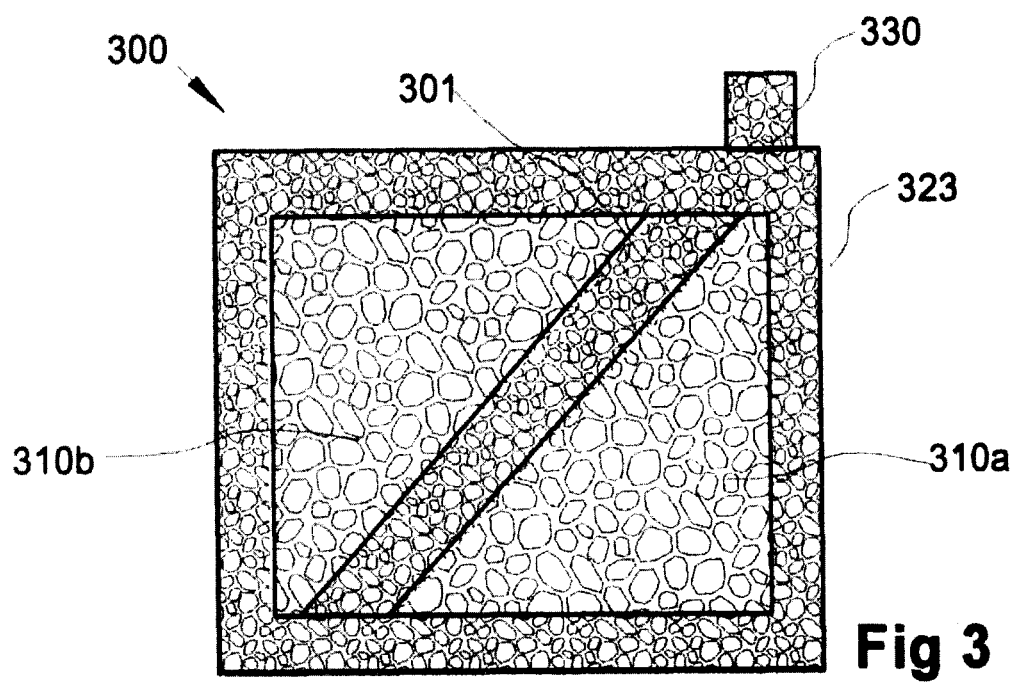
FIG. 3 is a sectional view of a three-compartment embodiment of an MCM in accordance with the present invention.

In FIGS. 1-3 the assembled MCM has a rectangular cross-section: however, any of a number of differing shapes are accommodated by the present invention and fall within the scope of the claims. Generally, the thickness of the matrix is substantially less than either the width or length.

Any matrix substance or combination of substances can be used so long as they are amenable to producing regions of differing electrical conductivity. The preferred matrix substrate is RPUF, which is well known and used for many diverse applications. The preferred RPUF has fully open cells that are produced by removing the window membrane of the cells, leaving only the skeletal structure intact. Processes for making such RPUF are well known.

Polyurethane is electrically non-conductive, consequently a conductive coating is deposited on the RPUF matrix. The type of coating will be determined by the application. For instance, if the current collector is being used in a lead acid battery, a lead alloy coating is preferred. If the current collector is being used in a lithium ion battery, a nickel coating may be preferred. In some applications it may be most beneficial to apply different types of electrical coating to the frame and body, or to apply different thickness of coating. The goal is to establish or enhance a difference in electrical conductivity between the regions.

An electrically active paste is used to fill the interstices of the matrix, as noted above. The composition of the paste varies depending upon the type of battery. For instance, for a lead acid battery the preferred paste may be a lead paste, lead oxide paste, or lead alloy paste. For a lithium ion battery, lithium cobalt dioxide paste is preferred for the positive current collector and lithiated carbon paste for the negative current collector. Depending on the matrix substrate, normally it is desired or necessary to pre-treat the matrix before pasting with a coating that will enhance the bonding of the paste to the matrix. Examples of such pre-pasting treatment are provided below.

By manipulating the specific surface area of different regions of the matrix one can substantially enhance both the strength and the performance of the current collector. For instance, if the specific surface area of a first region of the matrix, such as body 110, is less than the specific surface area of a second region, such as frame 120 and lug 130, the electrical conductivity of the frame/lug will be greater than the electrical conductivity of the body.

For example, in a preferred embodiment of the MCM for a lead acid battery, the specific surface area of the body 110 may be in the range of 1340-3280 $m^2/m^3$, and the specific surface area of the frame 120 and lug 130 may be in the range of 2680-6560 $m^2/m^3$. For a lithium ion battery, the specific surface area of the body will be generally higher than for a lead acid battery, for instance, in the range of 4750-6890 $m^2/m^3$ and approximately twice that for the frame/lug region. Generally, I have found a body:frame specific surface area ratio of about 1:2 to be satisfactory, but an optimal ratio for each particular application can be easily determined without undue experimentation by those who read and understand the disclosures herein.

The dimensions of the MCM will, of course, depend upon the specifications of the battery. In most cases, it is anticipated that the thickness of the MCM will be in the range of 0.3-0.8 mm for a lithium ion battery and 1.6-3.5 mm for a deep cycle lead acid battery. The frame and body are of substantially the same thickness when the matrix is assembled. These measurements are, of course, exemplary. Parameters such as pore density, specific surface area, thickness, width and length of the matrix will be dictated by the materials used and the specifications of the application.

FIG. 2 illustrates one embodiment of an MCM matrix 200 assembled in accordance with the present invention. This embodiment differs from that of FIG. 1 with respect to the dimensions and shape of the sides of the frame 220. For instance, top frame piece 221 has an irregular polygonal profile, gradually widening from the right edge toward the left edge where lug 230 is situated. This feature provides weight reduction relevant to the embodiment of FIG. 1 and enhanced corrosion resistance in the area of highest current concentration, that is, current entry and exit zone in the lug 230. FIG. 2 also illustrates the point that the sides 222, 223, 224 of the frame may be of different widths. When choosing a width for the frame sides one can enhance conductivity by increasing the width of side 224, which is in contact with lug 230, relative to bottom 222 and side 223.

FIG. 3 illustrates an embodiment of an MCM 300 in which the body region is divided into a plurality of low specific surface area sub-regions 310a, 310b by a high specific surface area barrier, namely, strip 301. The strip is a part of the frame and runs diagonally from the corner of frame 323 farthest from lug 330 to the corner of the frame closest to the lug. The advantage of this compartmentalization of the body is that it improves the current and potential distribution characteristics across the body, especially in the case of larger current collector designs. Providing a diagonal dividing strip as shown in FIG. 3 enhances current flow to the lug 330 from the most distant portion of the current collector. The strip, the sides of the frame, and the lug are of the same specific surface area and, hence, will have the same electrical conductivity once the matrix is treated to enhance conductivity. Strips with other orientations are also advantageous; for instance, two strips oriented vertically in the figure and dividing the body into three sub-regions.

Method of Making the MCM

Figure 4:
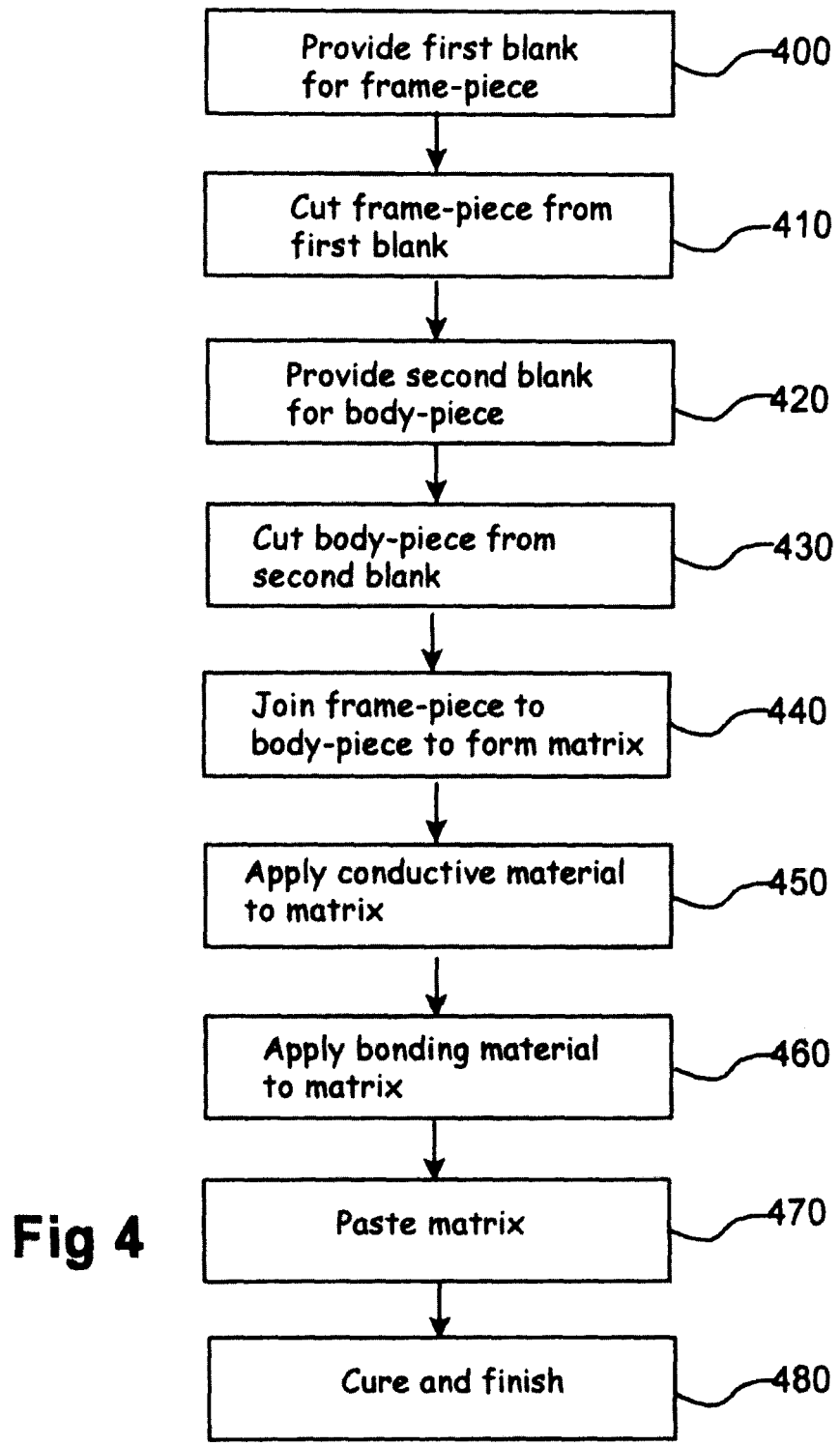
FIG. 4 is a flow chart diagram illustrating one embodiment of a method for making an MCM based electrode in accordance with the present invention.

FIG. 4 is a flow chart overview of one embodiment of a method for making an MCM and an electrode using an MCM in accordance with the present invention. The flow chart should be consulted in conjunction with FIG. 1. Although the steps of the method are depicted in a certain sequential order for ease of description, actual fabrication of the MCM and electrode may be carried out by parallel steps and not necessarily in the depicted order.

At Step 400 of the method a frame-blank for the frame piece, including the lug, is provided. The blank is made, for instance, of RPUF having a specific surface area referred to herein as the "frame specific surface area."

The frame-blank is cut 410, for instance with a die, to produce the frame piece with the attached lug. The frame forms a hollow or void region for receiving the body 110.

At Step 420 a RPUF blank is provided for the body piece. This material has a specific surface area, referred to herein as the "body specific surface area" that is less than the frame specific surface area. While it is not necessary that the body and frame made of the same type of matrix substrate, there are significant economic advantages for doing so.

The body piece is cut 430 to a size that is substantially the same as the void region of the frame piece. The thickness of the body piece and frame piece are substantially the same.

At Step 440 the body piece and frame piece are joined to form the assembled matrix, such that the body piece fills the void region of the frame. This joining step may be accomplished by thermal, physical, or chemical fusion of the body piece and frame piece by processes as are well known in the art. The result is a matrix as shown in FIG. 1 having two regions: a body and a frame/lug, wherein the body specific surface area is less than the frame specific surface area. As will be immediately evident, the cutting and joining steps can be easily adapted to produce more complex matrices, such as those shown in FIGS. 2 and 3.

At Step 450 the assembled matrix, which includes the body, frame, and lug, is treated with electro-conductive material. Various types of treatment are known in the art and are discussed below. The lug may optionally be coated with lead to increase its strength. At the end of this step the MCM has been converted to a multiply-conductive current collector having two distinct regions of differing specific surface area and conductivity.

At Step 460 a bonding material is applied to the matrix substrate to render the matrix substrate more amenable to holding the electro-active paste in the harsh conditions of the battery. Various options for this step are known in the art and are discussed below. This step may be optional, depending upon the type of paste and matrix substrate employed.

At Step 470 the MCM is pasted with an electro-active paste, such as one of those described above, and at Step 480, the pasted current collector is cured and finishing steps, such as trimming edges, are performed to produce the electrode ready for assembly into a battery.

The order of the steps as set forth in FIG. 4 is for illustration purposes and is not meant to be limiting. For instance, treating the matrix substance with electro-conductive material may occur prior to assembling the pieces into the matrix. It is also noted that whilst the term "multiply-conductive matrix" is most accurately applied to the assembled matrix after the electrically conductive material is applied at Step 450, the term also applies to the assembled matrix having the potential of becoming multiply-conductive by virtue of having a plurality of regions of differing specific surface area.

In another exemplary embodiment of the method, Steps 400-440 may be modified such that the body piece and the frame piece are cut from the same matrix substrate and initially have the same specific surface area. This embodiment of the method is illustrated in FIGS. 5-7.

A frame piece 520 is cut from a substrate blank. The frame piece includes the frame and lug 530. A body piece is initially cut as a rectangle 510 wherein the width of the rectangle is substantially equal to the width of the frame and the height of the rectangle is substantially equal to the height of the frame plus the height of the lug. It is most convenient if both pieces are cut from the same ground substance, preferably RPUF. Although the specific parameters will be determined by the particular application, with respect to the present embodiment, the thickness of each piece is taken to be 3 mm and the specific surface area of each piece is taken to be 1400 $M^2/m^3$.

Figure 5:
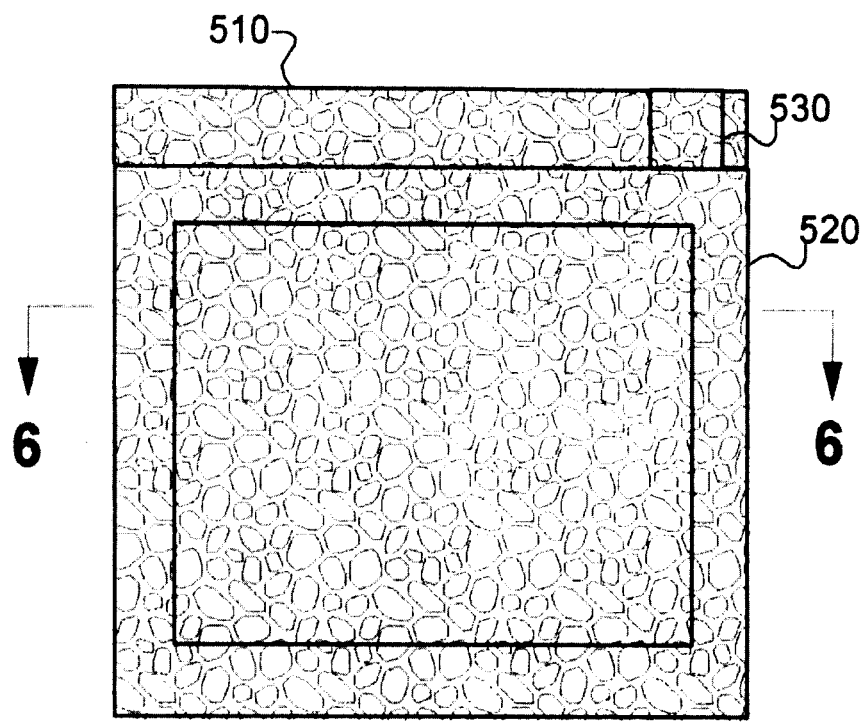
FIG. 5 is a flat view of a frame piece juxtaposed with a body piece during the production of an MCM according to the invention.

The two pieces are then juxtaposed as shown in FIG. 5 with the frame piece 520 laid upon the body piece 510 so that a face of the frame piece is placed against a face of the body piece and the bottom and side edges are aligned.

Figure 6:
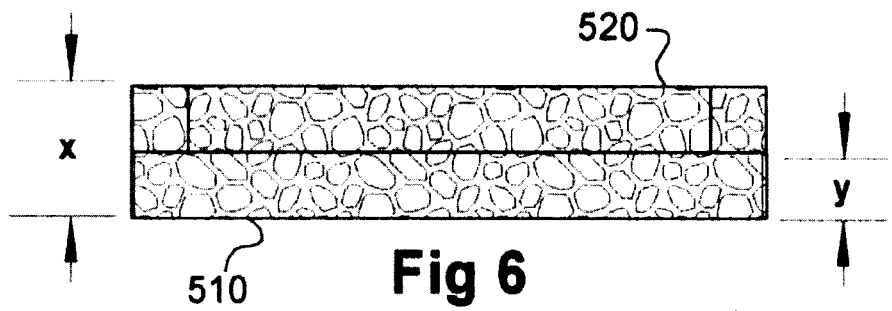
FIG. 6 is a sectional view of FIG. 5.
Figure 7:
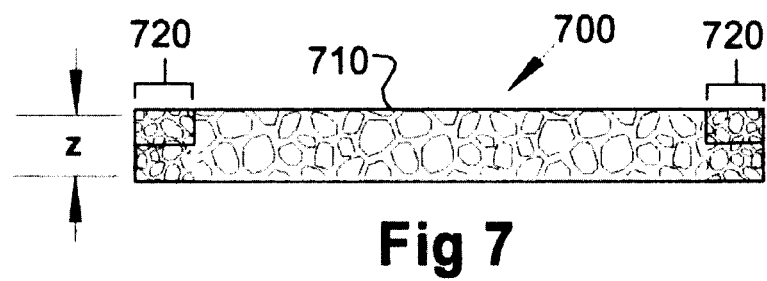
FIG. 7 is the sectional view as in FIG. 6 after compressing the frame piece into the body piece.

FIG. 6 shows a sectional end-view of the two pieces at this point in the process, with frame piece 520 positioned on body piece 510. The total thickness, x, of the two pieces is 6 mm, both pieces having a thickness, y, of 3 mm. Pressure is then applied downwards onto frame piece 520, thereby compressing it into the edges of body piece 510. This compresses the total thickness, x, of 6 mm around the edges into a total, uniform thickness, z, of about 3 mm, as shown in FIG. 7. Consequently, the specific surface area of the body region 710 remains essentially the same, 1400 $m^2/m^3$, while the specific surface area of the frame region 720 is approximately doubled. The result is a matrix 700 of uniform thickness of about 3 mm, z, and having a central body 710 surrounded by the frame 720. The body 710 retains the original thickness and specific surface area of the body piece 510, which is to say 3 mm and 1400 m$^2$/m$^3$, respectively. However, because the frame piece has been compressed into the edges of the body piece, the specific surface area of the frame region 720 is increased to about 2800 m$^2$/m$^3$. Consequently, when the matrix is treated with electro-conductive material, the conductivity of the frame and lug will be greater than the conductivity of the body.

After being compressed together as described above, the frame piece and body piece are permanently joined by thermal or chemical processes well known in the art. The resulting matrix is essentially as shown and described in FIG. 1.

Although the foregoing and following disclosures specify certain parameters such as thickness and specific surface areas, these are provided as examples only in order to fully teach the invention.

Details, Refinements, and Exemplary Results

A. Alternative Methods of Making Frame Region of the MCM

The primary objective in forming the matrix frame region is that the frame region is to have a higher specific surface area and, hence, the frame will be stiffer and stronger than the body. The foregoing disclosure sets forth how to produce such a frame from two separate pieces of matrix substrate cut to form the frame and body and then compressed together. It will be obvious to those skilled in the art after reading and comprehending this disclosure that this objective can be achieved in a number of ways.

Figure 8A:
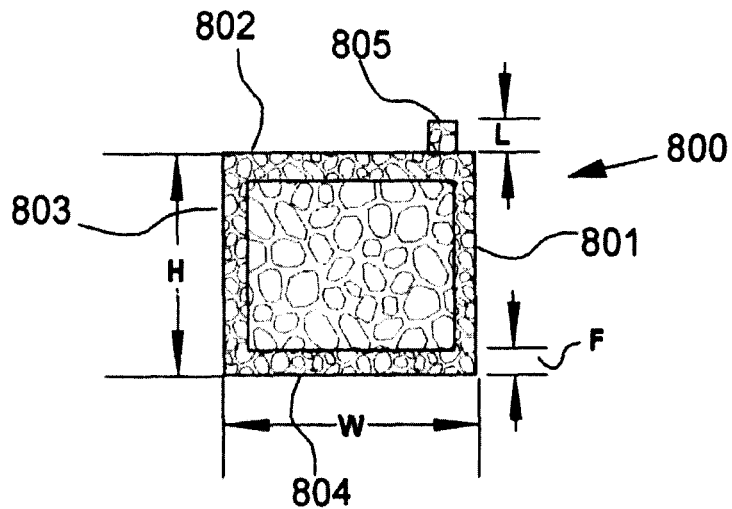
FIGS. 8a-c are sequential flat views of a MCM made according to the invention by means of folding the edges to produce the frame.
Figure 8B:
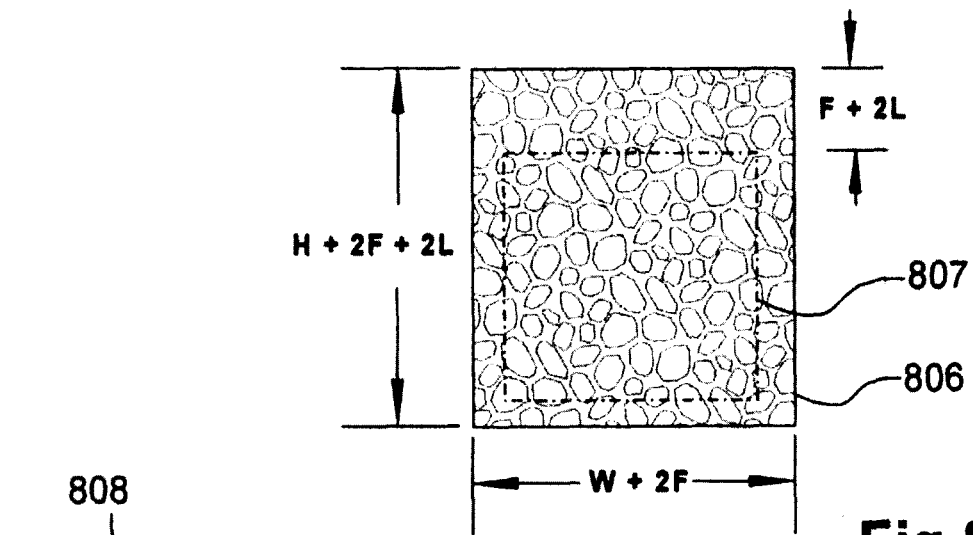
Figure 8C:
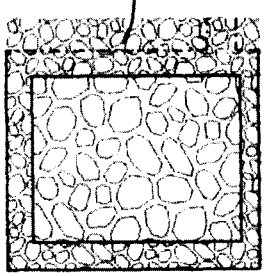

Referring to FIGS. 8a-8c, in this example one desires to produce a rectangular MCM 800 with a total width (W) and height (H). In this example the simple case, the width of the frame (F) is equal on all sides; however, the method is easily adapted to produce a frame having different widths on each side. The MCM includes a lug 805, which extends a distance L beyond the upper edge. The terms "top" 802, "bottom" 804, and "vertical sides" 801, 803 refer to the orientation of the MCM in the figures.

This MCM can be produced from a single oversized sheet of matrix substrate 806 as shown in FIG. 8b. What is meant by "oversized" is that 1) the width of the sheet is equal to the width of the final MCM (W) plus the sum of the widths (F) of the opposing vertical side frames, and 2) the height of the sheet is equal to the height (H) of the final MCM plus the sum of the widths (F) of the top and bottom frames plus two times the distance (L) the lug extends beyond the top of the MCM. These dimensions are indicated in FIG. 8b.

The oversized sheet is converted into the MCM by judiciously folding the edges of the sheet along the lines of the rectangle indicated as 807. The vertical side edges and bottom edge are folded inwards an amount equal to F, the width of the frame. The top edge of the sheet is folded inwards an amount equal to F plus 2 L. These folds result in rectangle with double-layer edges all around. After the top edge is folded, the lug is formed by excising excess substrate by cutting along the lines 808 indicated in FIG. 8c. At this point the edges are compressed in a manner similar to that described above. Depending on the substrate and circumstances, it may be helpful to fuse the double layers together prior to compressing them, or, alternatively, a cutting line can be inscribed along the folding line prior to folding the edges. This method thus produces from a single sheet of matrix substrate the desired MCM in which a frame and lug region have a higher specific surface area than the body.

B. Preparing the Matrix Substrate and Forming the MCM

For a lead acid battery application, two RPUF blanks having a specific surface area of about 1340 m$^2$/m$^3$ are used. The dimensions (height×width×thickness) of the first blank are 20 cm×30 cm×3 mm, respectively. The dimensions of the second blank are 20 cm×30 cm×5 mm, the only difference in the dimensions of the blanks in this example is that the second blank is 2 mm thicker than the first.

These two blanks are placed in a solution composed of 95% by weight furfuryl alcohol and 5% by weight oxalic acid for 30 seconds. They are removed from the solution and any excess solution is washed away by a convenient method, for instance using rollers.

The second blank is cut by a die cutter to the shape of the frame piece 520, which includes the lug. The frame/lug piece is then placed on top of the first blank, and the two are compressed together to a thickness of 3.0 mm. The compressed sheets are then placed in an oven for two hours at 200 degrees Celsius. This causes the two sections to fuse into a single matrix having one uniform thickness and with a body specific surface area of about 1340 m$^2$/m$^3$ and a frame specific surface area of about 2680 m$^2$/m$^3$. When the assembled matrix is treated with electro-conductive material, a MCM-based current collector is produced.

It is to be emphasized that these procedures allow one to incorporate the lug into the current collector much more easily, efficiently, and inexpensively than existing techniques. This is not an insignificant advantage given the multiple and cumbersome steps currently required to attach a lug to a current collector, such as spot welding, casting, or gluing.

C. Techniques for Enhancing Electrical Conductance of the RPUF Matrix Substrate

There are numerous techniques for enhancing the electrical conductivity of the RPUF matrix prior to the pasting step. Three of such techniques are set forth here.

First, electrical conductance of the surface of the matrix may be enhanced by cleaning, etching, and electroless plating the matrix in that order. A RPUF sheet is placed in a solution of 10% lead acetate in glacial acidic acid at the room temperature for about two minutes. The sheet is then removed from the solution, and any excess solution removed by washing. The sheet is then placed in a solution of 50 grams per liter of potassium dichromate in a mixture of 75% by weight water and 25% by weight of 98% sulfuric acid for about one minute. The sheet is then removed from the mixture and washed. The sheet is next immersed in a solution of three grams per liter of potassium borohydride and water for 20 minutes. The sheet is again washed and is either electroless plated with nickel or copper, or electroplated with copper, silver, lead, cadmium, or alloys using electroless solutions well known in the art of electroplating. The sheet is now ready for cutting, joining, and pasting as described above.

A second technique for enhancing the electrical conductance of the RPUF starting material is by spraying the polyurethane surface with a metallic substance like silver, nickel, copper, or nickel graphite based conductive spray. Conductive coating spray is widely used in electronics industry. Silver based conductive sprays are well known in the field and are commercially available. The RPUF may be first washed with water and then dried in an oven with the temperature set to 50 degree Celsius. The RPUF surface is then sprayed with silver based conductive spray in a clean environment.

A third technique for enhancing the electrical conductance of the RPUF matrix is by placing the RPUF in a mixture of 5% by weight P-toluene sulfonic acid and 95% by weight furfuryl alcohol for 30 seconds, removing the RPUF from the mixture, ridding it of any excess solution, air drying the infiltrated RPUF for approximately two hours to allow furfuryl to cross link and form furan plastic, and placing the RPUF in a high temperature inert gas furnace for 1 hour at 1100 degree Celsius to covert the RPUF to glassy carbon.

It is noted that these techniques of making the matrix electrically conductive treat the entire assembled MCM uniformly. However, in certain situations it may be more desirable to apply different quantities or types of electrical conductive material to the body and frame in order to enhance the difference in electrical conductivities.

D. Techniques for Bond-Coating the RPUF Matrix

Depending on the battery chemistry involved, a metal or metal alloy may be applied to a RPUF matrix in order to form a bonding surface for the electro-active paste. Numerous techniques are available for this step. Three are provided here.

First, as an example of a lithium ion battery application, prior to pasting, nickel is applied to the RPUF matrix by electroless nickel plating techniques and electroless nickel plating solutions well known in the field.

Second, for lead acid or lead silicate batteries, lead or lead alloy electroplating as commonly known in the art may be used to coat the RPUF matrix. Appropriate lead and lead alloy electroplating solutions are well known in the field and may be obtained from numerous commercial sources.

Third, metal or metal alloy can be applied by metal injection molding (MIM). MIM is a manufacturing process which combines the versatility of plastic injection molding with strength and integrity of the metal. In one embodiment, an MIM process used to apply nickel onto the RPUF matrix includes placing the matrix in a mold, inserting the mold in a molding machine similar to those used for standard plastic injection, providing the molding machine with nickel powder combined with plastic binders, which allow the metal to be injected into a mold, operating the molding machine, and, after the part is molded, removing the binders with solvents and a thermal process. The nickel powder is sintered at a temperature high enough to bind the particles but not to melt the nickel. The sintered nickel covered the conductive surface of the RPUF matrix.

E. Exemplary Results

The foregoing disclosures demonstrate how various methods may be used to make an MCM-based electrode according to the present invention. Presented below are comparative test data indicating how lead acid battery characteristics are improved by use of multiply-conductive RPUF type electrodes relative to carbon foam and conventional lead electrodes.

In Example 1, two 12 V batteries having capacities of 12 ampere hour (Ah) and 100 Ah were used in the comparisons. Each battery capacity was based on 12 V battery discharge at 10 hours discharge rate (C/10). Lead acid batteries using prototype MCM-based electrodes produced in accordance with the present invention were compared against lead acid batteries using carbon foam electrodes and conventionally made lead acid batteries. Comparison data on electrodes for the two capacities of battery are given in TABLE 1 and TABLE 2, respectively, where "Char." stands for characteristics; "C foam," carbon foam current collector, "Conv," conventional current collector; "PAM," positive active mass; "Util," utilization; "Wh/kg," watt hour/kg; "W/kg," watt/kg.

TABLE 1

| 12 Ah Battery Char. | MCM | C Foam | Conv |
|---|---|---|---|
| Total CC Weight (g) | 489 | 1017 | 984 |
| Total Number of CCs | 78 | 54 | 78 |

TABLE 1-continued

| 12 Ah Battery Char. | MCM | C Foam | Conv |
|---|---|---|---|
| Total Paste weight (g) | 1073 | 1788 | 1788 |
| Total Battery Weight(g) | 2710 | 3300 | 4400 |
| PAM Util. Efficiency (%) | 62 | 56 | 35 |
| Lead Use Reduction (%) | 38.41 | 25 | 0 |
| Energy Density (Wh/kg)* | 53 | 43 | 33 |
| Power Density (W/kg)* | 239 | 143 | 180 |

*The battery energy density and power density from the MCM current collector are increased by 23% and 67%, respectively, over those from the carbon foam counterpart, and by 61% and 33%, respectively, over those from the conventional current collector.

TABLE 2

| 100 Ah Battery Char. | MCM | C Foam | Conv |
|---|---|---|---|
| Total CC Weight (g) | 5562 | 8037 | 8994 |
| Total Number of CCs | 90 | 54 | 90 |
| Total Paste Wt (g) | 10267 | 17112 | 17112 |
| Total Battery Wt (g) | 24278 | 27943 | 38400 |
| PAM Util. Efficiency (%) | 63 | 55 | 25 |
| Lead Use Reduction (%) | 36.78 | 27.23 | 0 |
| Energy Density (Wh/Kg)^ | 50 | 43 | 31 |
| Power Density (W/kg) | 344 | 215 | 259 |

^The battery energy density and power density from the MCM current collector are increased by 16% and 60%, respectively, over those from the carbon foam counterpart, and by 61% and 33%, respectively, over those from the conventional current collector.

In another example an MCM with a frame and lug attached to the body was fabricated as disclosed above for a 12V 100 Ah lead acid battery. The MCM had dimensions of 185 mm×152 mm×2 mm (height×width×thickness). The RPUF was made conductive by cleaning and etching followed by electroless plating and was subsequently electroplated by lead electroplating, as described above. The weight of this current collector was measured at the end of each phase of fabrication. The weight was 20 gm with non-conductive RPUF substrate, 22 gm after conductive material was applied to the assembled MCM, and 85 gm total weight after the matrix was electroplated. This may be compared with a weight of approximately 115 gm for a traditional lead current collector having the same dimensions.

Summary

The invention disclosed here may be summarized by means of the following enumerated statements:

Statement 1.

The invention comprises a multiply-conductive matrix (MCM) for a current collector, said MCM comprising:
  a. a first region; and,
  b. a second region,
wherein the electrical conductivity of said second region is greater than the electrical conductivity of said first region.

Statement 2.

The invention comprises an MCM according to Statement 1 wherein said second region forms a frame around said first region.

Statement 3.

The invention comprises an MCM according to Statement 2 wherein at least one of said first region and said second region comprises a lug.

Statement 4.

The invention comprises an MCM according to Statement 2 wherein at least a portion of said second region forms at least one strip through said first region, whereby said first region is divided into at least two sub-regions by the strip.

Statement 5.

The invention comprises an MCM according to Statement 1 wherein the electrical conductivities of said first region and said second region are determined by the relative specific surface areas of said first region and said second region.

Statement 6.

The invention comprises an MCM according to Statement 1 wherein at least one of said first region and said second region is made of a polymer.

Statement 7.

The invention comprises an MCM according to Statement 6 wherein the polymer is reticulated polyurethane foam.

Statement 8.

The invention comprises an MCM according to Statement 1 wherein at least one of said first region and said second region is made of carbon foam.

Statement 9.

The invention comprises an electrode comprising:
a. a current collector,
b. a matrix forming a base for said current collector, said matrix comprising:
  i. a first region; and,
  ii. a second region;
b. an electro-conductive coating applied to said matrix; and,
c. an electro-active paste applied to said matrix,
wherein the electrical conductivity of said second region is greater than the electrical conductivity of said first region.

Statement 10.

The invention comprises an electrode according to Statement 9 further comprising a bonding material, wherein said bonding material enhances the bonding of said electro-active paste to said matrix.

Statement 11.

The invention comprises an electrode according to Statement 9 or Statement 10 wherein said second region forms a frame around said first region.

Statement 12.

The invention comprises an electrode according to Statement 9 or Statement 10 wherein said second region comprises a lug.

Statement 13.

The invention comprises an electrode according to Statement 9 or Statement 10 wherein said second region forms one or more strips through said first region, whereby said first region is divided into at least two sub-regions by the strip or strips.

Statement 14.

The invention comprises a battery comprising at least one electrode of the type disclosed in one of Statements 9 to 12, inclusive.

Statement 15.

The invention comprises a method for producing the multiply-conductive matrix of Statement 1, said method comprising the steps of: Step (a) providing a matrix, wherein the matrix has a body region and a frame region, and wherein the frame region has a higher specific surface area than the body region; Step (b) applying an electrically conductive substance to the matrix of Step (a), wherein the resulting electrical conductance of the second region is greater than the resulting electrical conductance of the first region.

Statement 16.

The invention comprises the method of Statement 15, wherein Step (a) comprises the steps of: Step (a1) forming a first piece out of matrix substrate having a first specific surface area;
Step (a2) forming a second piece out of matrix substrate having a second specific surface area, wherein the second specific surface area is greater than the first specific surface area of Step (a1); and, Step (a3) joining the first piece of Step (a1) and the second piece of Step (a2) to form the matrix of Step (a).

Statement 17.

The invention comprises the method of Statement 16 wherein Step (a2) comprises cutting the matrix substrate to form a frame that fits around the first piece of Step (a1), and wherein Step (a3) comprises placing the frame around the first piece.

Statement 18

The invention comprises the method of Statement 16 wherein Step (a2) is performed by forming a frame, and wherein Step (a3) comprises compressing together the frame and the first piece of Step (a1).

Statement 19

The invention comprises method of Statement 15 wherein Step (a) comprises the steps of: Step (a4) folding the edges of a sheet of matrix substrate to form a region along the edges having two-layers, and Step (a5) compressing the two-layers of Step (a4) together to form the frame region of Step (a).

Statement 20

The invention comprises the method of Statement 19 further comprising the step of excising part of the matrix substrate from one folded edge to form a lug.

The preferred embodiments disclosed herein are to be considered as illustrative and not restrictive of the scope of the invention, which is to be determined by the appended claims as construed in view of the disclosure.

What is claimed is:

1. A current collector comprising:
  (a) a multiply-conductive matrix (MCM), said MCM comprising a porous substrate, the porous substrate comprising:
    (i) a porous first section; and
    (ii) a porous second section;
  wherein at least a part of said porous second section circumscribes said porous first section and said part of said porous second section forms a frame around said porous first section, and
  wherein said part of said porous section is porous; and
  (b) an electroconductive coating applied to said porous substrate;
  wherein at least said porous first section and said part of said porous second section are electrically conductive, and the electrical conductivity of said part of said porous second section is greater than the electrical conductivity of said porous first section; and
  wherein the specific surface area of said part of said porous second section is greater than the specific surface area of said porous first section.

2. The current collector according to claim 1 wherein said porous second section comprises a lug.

3. The current collector according to claim 1 wherein said porous second section includes at least one strip extending through said porous first section, whereby said porous first section is divided into at least two sub sections by said strip.

4. The current collector according to claim 1 wherein the electrical conductivities of said porous first section and said part of said porous second section are determined by the relative specific surface areas of said porous first section and said part of said porous second section.

5. The current collector according to claim 1 wherein at least one of said porous first section and said porous second section is made of a polymer.

6. The current collector according to claim 5 wherein the polymer is reticulated polyurethane foam (RPUF).

7. The current collector according to claim 1 wherein at least one of said porous first section and said porous second section is made of carbon foam.

8. A method for producing the multiply-conductive matrix (MCM) for a current collector, wherein said MCM comprises a porous substrate, wherein said porous substrate comprises: (i) a first region having pores; and (ii) a second region having pores; wherein at least part of said second region forms a frame around said first region, and the electrical conductivity of said second region is greater than the electrical conductivity of said first region, said method comprising the steps of:
   Step (a) providing the substrate wherein the second region has a higher specific surface area than the first region; and,
   Step (b) applying an electrically conductive substance to the substrate,
   whereby the electrical conductivity of said second region is greater than the electrical conductivity of said first region.

9. The method of claim 8, wherein Step (a) comprises the steps of:
   Step (a1) forming a first piece out of a first blank having a first specific surface area;
   Step (a2) forming a second piece out of a second blank having a second specific area, wherein the second specific surface area is greater than the first specific surface area; and
   Step (a3) joining the first piece and the second piece to form the substrate wherein the first piece is the first region and the second piece is the second region.

10. The method of claim 9 wherein Step (a2) comprises cutting the second blank such that the second piece forms a frame that fits around the first piece, and wherein Step (a3) comprises placing the second piece around the first piece.

11. The method of claim 8 wherein Step (a) comprises the steps of:
   Step (a1) forming a frame piece from a substrate blank;
   Step (a2) forming a body piece from the substrate blank, wherein the body and frame pieces have substantially the same width and height; and
   Step (a3) placing the frame piece over the body piece then compressing together the frame piece and a portion of the body piece to form the second region and wherein the uncompressed portion of the body piece forms the first region.

12. The method of claim 8 wherein Step (a) comprises the steps of:
   Step (a1) folding the edges of a substrate sheet inwards to form a two-layer region along the edges of the substrate sheet; and
   Step (a2) compressing the two-layer region of Step (a1) to form the second region of the substrate and wherein the uncompressed region of the substrate sheet forms the first region of the substrate.

13. The method of claim 12 further comprising the step of excising part of the substrate sheet from one folded edge to form a lug.

14. An electrode comprising:
   (a) a current collector comprising:
      (i) a multiply-conductive matrix, said matrix comprising a porous substrate, said porous substrate comprising:
         (A) a porous first section; and
         (B) a porous second section;
      wherein at least a part of said porous second section circumscribes said porous first section and said part of said porous section forms a frame around said porous first section, wherein said part of said porous second section is porous; and
         (ii) an electro-conductive coating applied to said porous substrate;
      wherein at least said porous first section and said part of said porous second section are electrically conductive, and the electrical conductivity of said part of said porous second section is greater than the electrical conductivity of said porous first section; and
      wherein the specific surface area of said part of said porous second section is greater than the specific surface area of said porous first section; and
   (b) an electro-active paste applied to said current collector.

15. The electrode according to claim 14 further comprising a bonding material, wherein said bonding material enhances the bonding of said electro-active paste to said matrix.

16. The electrode according to claim 14 wherein said porous second section comprises a lug.

17. The electrode according to claim 14 wherein said porous second section further includes one or more strips extending through said porous first section, whereby said porous first section is divided into at least two porous subsection by the strip or strips.

18. A battery comprising at least one electrode of the type claimed in claim 14.

19. A current collector comprising:
   (a) a multiply-conductive matrix (MCM), said MCM comprising a porous foam substrate, said porous foam substrate comprising:
      (i) a foam body, wherein said foam body is porous; and
      (ii) a foam frame, wherein said foam frame is porous;
      wherein said foam frame circumscribes said foam body, and wherein the specific surface area of said foam frame is greater than the specific surface area of said foam body; and
   (b) an electroconductive coating applied to said porous substrate;
   wherein said foam body and said foam frame are electrically conductive, and the electrical conductivity of said foam frame is greater than the electrical conductivity of said foam body.

20. The current collector according to claim 19, wherein the porous foam is a reticulated polyurethane foam (RPUF).

21. An electrode comprising:
   (a) a current collector comprising:
      (i) a multiply-conductive matrix (MCM), said MCM comprising a porous foam substrate, said porous foam substrate comprising:
         (A) a foam body, wherein the foam body is porous; and
         (B) a foam frame, wherein the foam frame is porous;
         wherein the foam frame circumscribes the foam body, and wherein the specific surface area of said foam frame is greater than the specific surface area of said foam body; and
      (ii) an electro-conductive coating applied to said porous substrate;
      wherein said foam body and said foam frame are electrically conductive, and the electrical conductivity of said foam frame is greater than the electrical conductivity of said foam body; and
   (b) an electro-active paste applied to said current collector.

22. The electrode according to claim 21, wherein the porous foam is a reticulated polyurethane foam (FPUF).

* * * * *